US008077013B2

(12) United States Patent
Cooper

(10) Patent No.: US 8,077,013 B2
(45) Date of Patent: Dec. 13, 2011

(54) RFID READER Q-PARAMETER AIDED BY RF POWER MEASUREMENT

(75) Inventor: Scott A. Cooper, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 1295 days.

(21) Appl. No.: 11/622,686

(22) Filed: Jan. 12, 2007

(65) Prior Publication Data

US 2007/0164851 A1     Jul. 19, 2007

Related U.S. Application Data

(60) Provisional application No. 60/758,349, filed on Jan. 12, 2006.

(51) Int. Cl.
*H04Q 5/22* (2006.01)
(52) U.S. Cl. ............... 340/10.2; 340/10.3; 340/10.5
(58) Field of Classification Search .......... 340/10.2, 340/572.1, 572.4, 10.3, 10.5
See application file for complete search history.

(56) References Cited

U.S. PATENT DOCUMENTS

| | | | |
|---|---|---|---|
| 6,512,478 B1 | 1/2003 | Chien | |
| 7,391,329 B2 * | 6/2008 | Humes et al. | 340/572.4 |
| 2005/0280505 A1 * | 12/2005 | Humes et al. | 340/10.1 |
| 2007/0109129 A1 * | 5/2007 | Sundstrom et al. | 340/572.2 |

OTHER PUBLICATIONS

EPCGLOBAL, Inc. "Specification for RFID Air Interface-EPC Radio-Frequency Identity Protocols Class-1 Generation-2 UHF RFID Protocol for Communications at 860 MHz-960 MHz, Version 1.1.0." (a.k.a. "The Gen 2 Spec".) EPCglobal Inc., Dec. 17, 2005. http://www.epcglobalinc.org.
EPCGLOBAL Inc. "Specification for RFID Air Interface-EPC Radio-Frequency Identity Protocols Class-1 Generation-2 UHF RFID Protocol for Communications at 860 MHz-960 MHz, Version 1.0.8." EPCglobal Inc., Dec. 14, 2004. http://www.epcglobalinc.org.
Declaration of Stacy L. Jones authenticating attached Website Materials as accessed and posted at http://www.autoid.org/SC31/sc_31_wg4_sg3.htm on Sep. 1, 2006.
"Declaration of Stacy L. Jones authenticating attached website materials", www.autoid.org/SC31/sc_31_wg4_sg3.htm, Sep. 1, 2006.
EPCGLOBAL, Inc, "Specification of RFID Air Interface-EPC Radio- Frequency Identity Protocols Class-1 Generation-2 UHF RFID Protocol for Communications at 860 MHz-960 MHz, Version 1.1.0." (a.k.a. "The Gen 2 Spec") EPCglobal Inc., http://www.epcglobalinc.com, Dec. 14, 2004.
EPCGLOBAL, Inc, "Specification of RFID Air Interface-EPC Radio- Frequency Identity Protocols Class-1 Generation-2 UHF RFID Protocol for Communications at 860 MHz-960 MHz, Version 1.1.0." (a.k.a. "The Gen 2 Spec") EPCglobal Inc., http://www.epcglobalinc.org, Dec. 17, 2005.
Erup, Lars et al., "Interpolation in Digital Modems—Part II: Implementation and Performance,"IEEE Transactions on Communications, vol. 41, No. 6, Jun. 1993, 998-1008.
Gardner, Floyd M. , "Interpolation in Digital Modems—Part I: Fundamentals,"IEEE Transactions on Communications, vol. 41, No. 3, Mar. 1993, 501-507.

* cited by examiner

*Primary Examiner* — Vernal Brown
(74) *Attorney, Agent, or Firm* — Turk IP Law, LLC

(57) ABSTRACT

RFID tag responses are detected by an RFID reader system. The tag response may be detected based on a reference measurement during a tag silent period and another one during the tag response. This helps determine whether a slot is empty or occupied, in a slotted aloha algorithm. The result is reported to the Q-algorithm for a better decision.

52 Claims, 11 Drawing Sheets

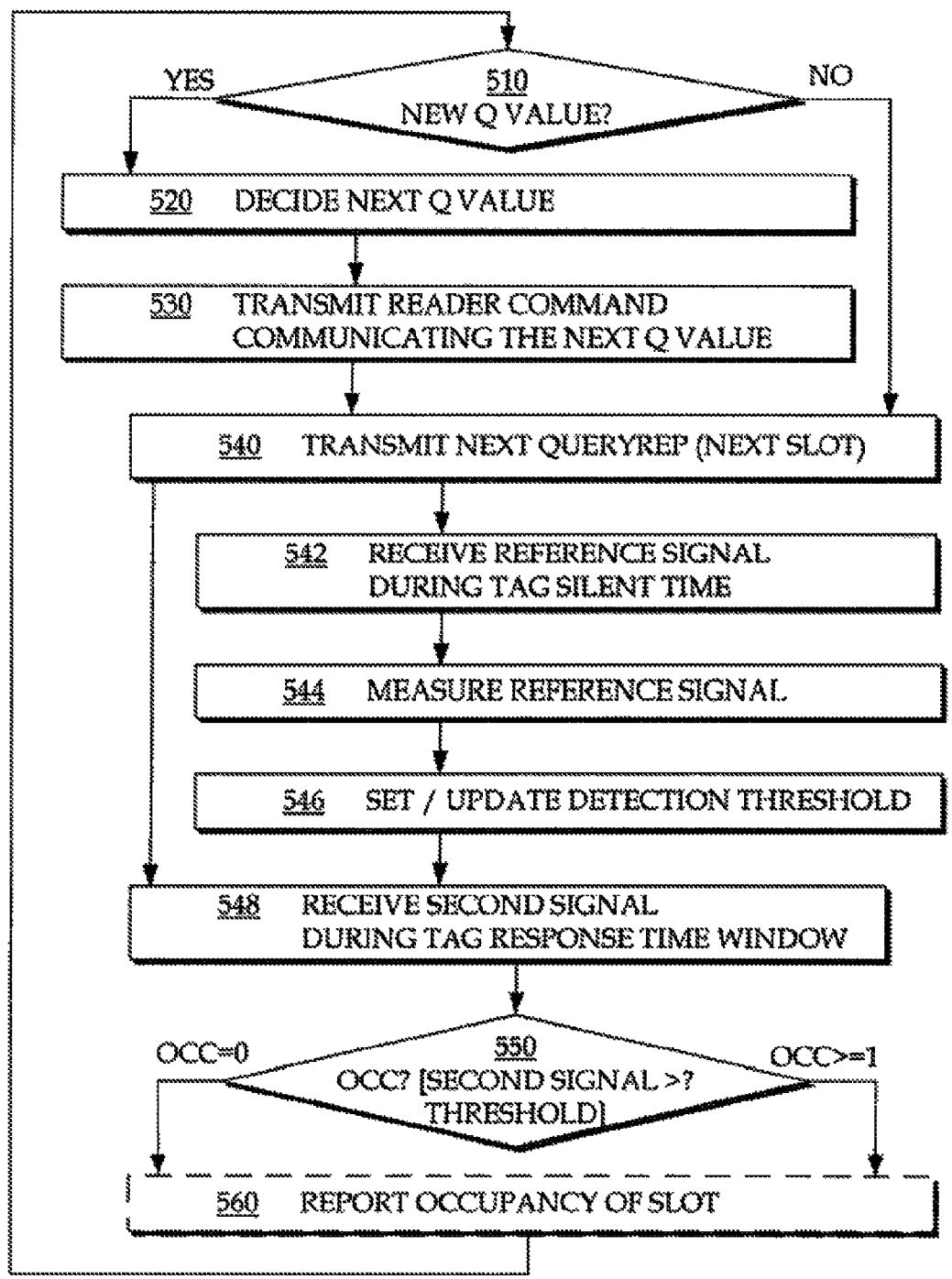
FIG. 5  *METHODS*

| COMMAND | PAY LOAD | CURRENT Q | TAGS DO |
|---|---|---|---|
| Query<br>QueryRep<br>•<br>•<br>•<br>•<br>•<br>•<br>•<br>[addressed all tags in round] | (Q1) | Q = Q1 | FILL slot counter per Q / reply if 0<br>Decrement counter / reply if 0<br>•<br>•<br>•<br>•<br>•<br>•<br>• |
| Query<br>QueryRep<br>•<br>•<br>•<br>•<br>•<br>•<br>•<br>[addressed all tags in round] | (Q2) | Q = Q2 | FILL slot counter per Q / reply if 0<br>Decrement counter / reply if 0<br>•<br>•<br>•<br>•<br>•<br>•<br>• |

- Round 1 of singulating tags during event
- Round 2 of singulating tags during event (dropouts, collisions, etc.)

*SINGULATING TAGS*
*COMPLETE INVENTORY ROUNDS*

FIG. 7A (PRIOR ART)

| COMMAND | PAY LOAD | CURRENT Q | TAGS DO |
|---|---|---|---|
| Query<br>QueryRep<br>●<br>●<br>● | (Q3) | Q = Q3 | FILL slot counter per Q / reply if 0<br>Decrement counter / reply if 0<br>●<br>●<br>● |
| QueryAdj<br>QueryRep<br>●<br>●<br>● | (+CA) | Q ← Q3 + CA<br>(Q = Q4) | REFILL counter per Q / reply if 0<br>Decrement counter / reply if 0<br>●<br>●<br>● |
| QueryAdj<br>QueryRep<br>●<br>●<br>● | (-CB) | Q ← Q4 - CB<br>(Q = Q5) | REFILL counter per Q / reply if 0<br>Decrement counter / resp. if 0<br>●<br>●<br>● |
| QueryAdj<br>QueryRep<br>●<br>●<br>● | (+CC) | Q ← Q5 + CC<br>(Q = Q6) | REFILL counter per Q / reply if 0<br>Decrement counter / resp. if 0<br>●<br>●<br>● |
| QueryAdj<br>QueryRep<br>●<br>●<br>● | (-CD) | Q ← Q6 - CD<br>(Q = Q7) | REFILL counter per Q / reply if 0<br>Decrement counter / resp. if 0<br>●<br>●<br>● |
| QueryAdj<br>QueryRep<br>●<br>●<br>● | (+CE) | Q ← Q7 + CE<br>(Q = Q8) | REFILL counter per Q / reply if 0<br>Decrement counter / resp. if 0<br>●<br>●<br>● |
| QueryAdj<br>QueryRep<br>●<br>●<br>● | (-CF) | Q ← Q8 - CF | REFILL counter per Q / reply if 0<br>Decrement counter / reply if 0<br>●<br>●<br>● |

*SINGULATING TAGS:*
*ADDITIONAL (SHORTER) COMMANDS*
*FOR Q INCREMENTS AND DECREMENTS*
*INCOMPLETE ROUNDS*

FIG. 7B (PRIOR ART)

RFID READER Q-PARAMETER AIDED BY RF POWER MEASUREMENT

RELATED APPLICATIONS

This utility patent application claims the benefit of U.S. Provisional Application Ser. No. 60/758,349 filed on Jan. 12, 2006, which is hereby claimed under 35 U.S.C. §119(e). The provisional application is incorporated herein by reference.

This application may be found to be related to the following application, which is incorporated herein by reference: Application titled "RFID READER SYSTEMS AIDED BY POWER MEASUREMENT", by inventors Scott A. Cooper and Christopher J. Diorio, Ser. No. 11/622,066 filed with the USPTO on Jan. 11, 2007, and due to be assigned to the same assignee.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

A typical application for an RFID reader is to read the codes of tags brought in its field of view, which is also called inventorying the tags. Since many tags could be brought in front of the reader at the same time, there is a process for inventorying that forces the tags to be addressed individually, called singulation.

Stingulation often uses a technique called the slotted aloha technique. The slotted aloha technique distributes the RFID tag population in sequential slots, which will be described later in more detail. The reader determines a value for a Q-parameter and transmits it to the tags. The tags occupy the slots according to random numbers. When a tag occupies a single slot, it can be read out individually, without interference from the others.

When first encountering a population of RFID tags, the reader does not know how many they are. Yet it chooses, as a guess, a value for the Q-parameter that creates slots. There is an optimum number of slots to create for a population of a given size, and if the reader makes a poor guess, it will not inventory the tags quickly.

Improvements to the slotted aloha technique have been made when the reader further runs an algorithm that can change the value of the Q parameter, depending on what is being encountered in the field. Such an algorithm is called a Q-algorithm. If a better value of Q is reached, then inventorying can be accelerated. Such improvements are described, for example, in copending U.S. patent application Ser. Nos. 11/210/573, 11/210,575, and 11/210,422, all filed on Aug. 24, 2005, all due to be assigned to the same assignee, and all incorporated herein by reference.

A requirement for a Q-algorithm is that it learns how tags are distributed in the slots it has created, as it is examining the slots. A problem with this is interference from noise sources in the environment. These may mask tag responses, or be mistaken by the reader as a true tag response. In addition to giving false readings from tags, they can also mislead the Q-algorithm.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to detecting RFID tag responses in an RFID reader. The tag response may be detected based on a reference measurement during a tag silent period and another one during the tag response. This helps determine whether a slot is empty or occupied, which is reported to the Q-algorithm for a better decision. Results are improved because the reference measurement is made at a time when the tags are known to be silent.

BRIEF DESCRIPTION OF THE DRAWINGS

Non-limiting and non-exhaustive embodiments are described with reference to the following drawings.

FIG. 5 is a flowchart for describing a process for an RFID reader system to measure received signals, for reporting the occupancy of slots according to embodiments;

FIG. 7A is an action table illustrating actions for an RFID reader system to singulate a population of RFID tags with complete inventory rounds.

FIG. 7B is another action table illustrating actions for an RFID reader system to singulate a population of RFID tags with incomplete inventory rounds.

DETAILED DESCRIPTION

Figure 1:
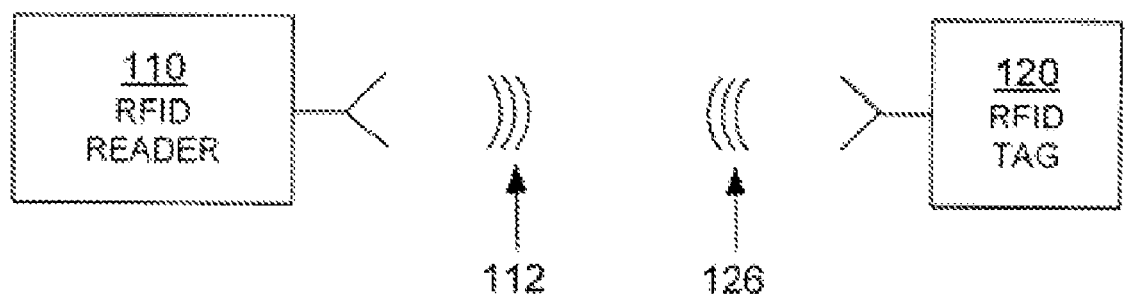
FIG. 1 is a diagram of an example RFID system including an RFID reader communicating with an RFID tag in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meanings of "a," "an," and "the" includes plural reference, the meanings of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and decoded from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active tag, i.e. having its own power source. Where tag 120 is a passive tag, it is powered from wave 112.

Figure 2:
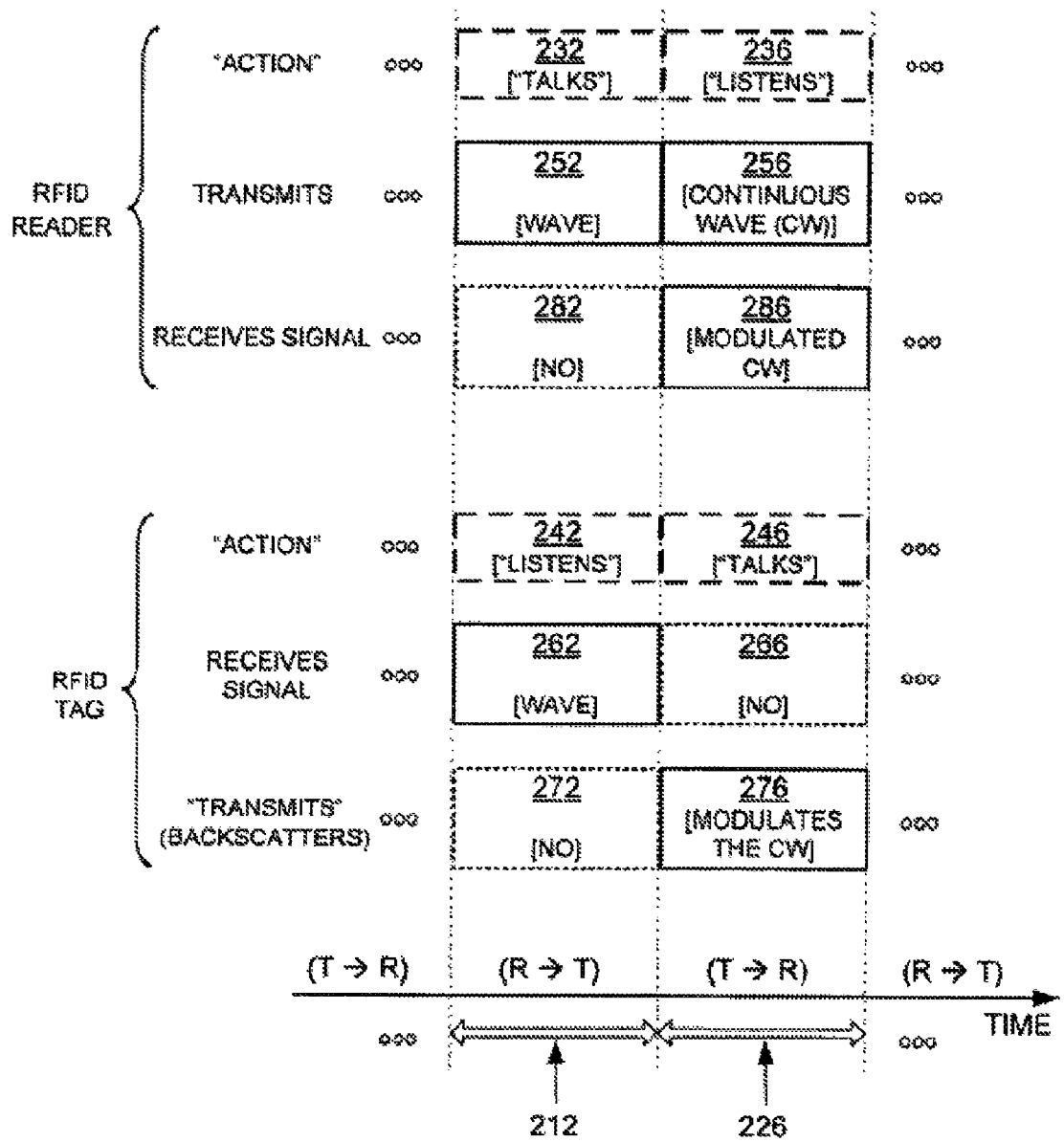
FIG. 2 is a diagram for explaining a half-duplex mode of communication between the components of the RFID system of FIG. 1.

FIG. 2 is a diagram 200 for explaining the half-duplex mode of communication between the components of the RFID system of FIG. 1, especially when tag 120 is implemented as a passive tag. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 212, and a following sample T→R communication session occurs during a time interval 226. Of course interval 212 is typically of a different duration than interval 226—here the durations are shown approximately equal only for purposes of illustration.

According to blocks 232 and 236, RFID reader 110 talks during interval 212, and listens during interval 226. According to blocks 242 and 246, RFID tag 120 listens while reader 110 talks (during interval 212), and talks while reader 110 listens (during interval 226).

In terms of actual technical behavior, during interval 212, reader 110 talks to tag 120 as follows. According to block 252, reader 110 transmits wave 112, which was first described in FIG. 1. At the same time, according to block 262, tag 120 receives wave 112 and processes it, to extract data and so on. Meanwhile, according to block 272, tag 120 does not backscatter with its antenna, and according to block 282, reader 110 has no wave to receive from tag 120.

During interval 226, tag 120 talks to reader 110 as follows. According to block 256, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 226, according to block 266, tag 120 does not receive a signal for processing. Instead, according to block 276, tag 120 modulates the CW emitted according to block 256, so as to generate backscatter wave 126. Concurrently, according to block 286, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 Mhz-960 Mhz, which is also colloquially known as "the Gen2 Spec". The Gen2 Spec has been ratified by EPCglobal, which is an organization that maintains a website at: <http://www.epcglobaline.org/> at the time this document is initially filed with the USPTO.

It was described above how reader 110 and tag 120 communicate in terms of time. In addition, communications between reader 110 and tag 120 may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 110 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 120 can respond with a backscatter that is modulated directly onto the frequency of the reader's emitted CW, also called baseband backscatter. Alternatively, Tag 120 can respond with a backscatter that is modulated onto a frequency, developed by Tag 120, that is different from the reader's emitted CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 3:
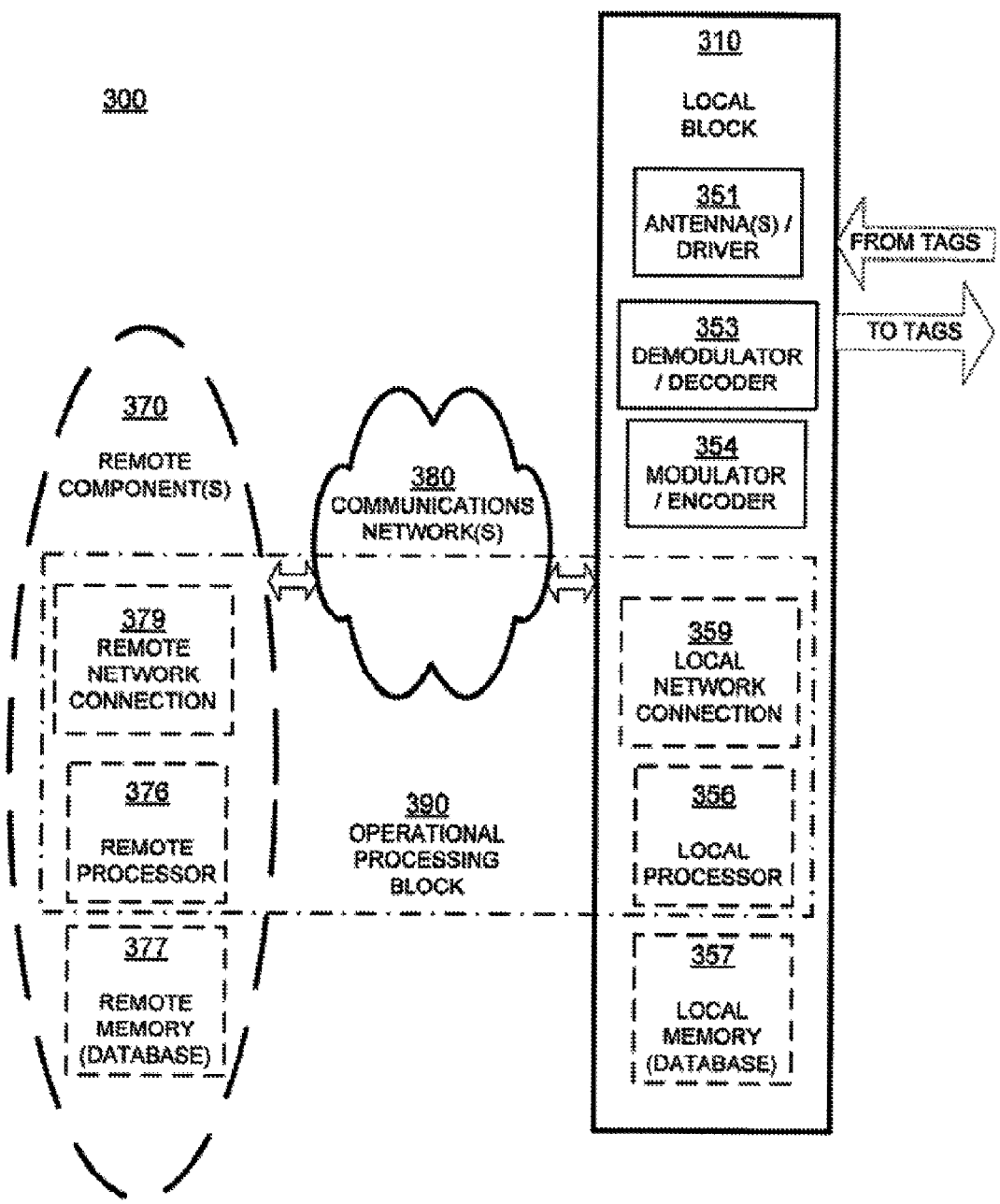
FIG. 3 is a block diagram of a whole RFID reader system according to embodiments.

FIG. 3 is a block diagram of a whole RFID reader system 300 according to embodiments. System 300 includes a local block 310, and optionally remote components 370. Local block 310 and remote components 370 can be implemented in any number of ways. It will be recognized that reader 110 of FIG. 1 is the same as local block 310, if remote components 370 are not provided. Alternately, reader 110 can be implemented instead by system 300, of which only the local block 310 is shown in FIG. 1.

Local block 310 is responsible for communicating with the tags. Local block 310 includes a block 351 of an antenna and a driver of the antenna for communicating with the tags. Some readers, like that shown in local block 310, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 353 demodulates and decodes backscattered waves received from the tags via antenna block 351. Modulator/encoder block 354 encodes and modulates an RF wave that is to be transmitted to the tags via antenna block 351.

Local block 310 additionally includes an optional local processor 356. Processor 356 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 353, the encoding function in block 354, or both, may be performed instead by processor 356.

Local block 310 additionally includes an optional local memory 357. Memory 357 may be implemented in any number of ways known in the art. Such ways include, by way of examples and not of limitation, nonvolatile memories (NVM), read-only memories (ROM), random access memories (RAM), any combination of one or more of these, and so on. Memory 357, if provided can include programs for processor 356 to run, if provided.

In some embodiments, memory 357 stores data read from tags, or data to be written to tags, such as Electronic Product Codes (EPCs), Tag Identifiers (TIDs) and other data. Memory 357 can also include reference data that is to be compared to the EPC codes, instructions and/or rules for how to encode commands for the tags, modes for controlling antenna 351, and so on. In some of these embodiments, local memory 357 is provided as a database.

Some components of local block 310 typically treat the data as analog, such as the antenna/driver block 351. Other components such as memory 357 typically treat the data as digital. At some point there is a conversion between analog and digital. Based on where this conversion occurs, a whole reader may be characterized as "analog" or "digital", but most readers contain a mix of analog and digital functionality.

If remote components 370 are indeed provided, they are coupled to local block 310 via an electronic communications network 380. Network 380 can be a Local Area Network (LAN), a Metropolitan Area Network (MAN), a Wide Area Network (WAN), a network of networks such as the internet, and so on. In turn, local block 310 then includes a local network connection 359 for communicating with network 380.

There can be one or more remote component(s) 370. If more than one, they can be located at the same place with each other, or in different places. They can access each other and local block 310 via network 380, or via other similar networks, and so on. Accordingly, remote component(s) 370 can use respective remote network connections. Only one such remote network connection 379 is shown, which is similar to local network connection 359, etc.

Remote component(s) 370 can also include a remote processor 376. Processor 376 can be made in any way known in the art, such as was described with reference to local processor 356.

Remote component(s) 370 can also include a remote memory 377. Memory 377 can be made in any way known in the art, such as was described with reference to local memory 357. Memory 377 may include a local database, and a different database of a Standards Organization, such as one that can reference EPCs.

Of the above-described elements, it is advantageous to consider a combination of these components, designated as operational processing block 390. Block 390 includes those that are provided of the following: local processor 356, remote processor 376, local network connection 359, remote network connection 379, and by extension an applicable portion of network 380 that links connection 359 with connection 379. The portion can be dynamically changeable, etc. In addition, block 390 can receive and decode RF waves received via antenna 351, and cause antenna 351 to transmit RF waves according to what it has processed.

Block 390 includes either local processor 356, or remote processor 376, or both. If both are provided, remote processor 376 can be made such that it operates in a way complementary with that of local processor 356. In fact, the two can cooperate. It will be appreciated that block 390, as defined this way, is in communication with both local memory 357 and remote memory 377, if both are present.

Accordingly, block 390 is location agnostic, in that its functions can be implemented either by local processor 356, or by remote processor 376, or by a combination of both. Some of these functions are preferably implemented by local processor 356, and some by remote processor 376. Block 390 accesses local memory 357, or remote memory 377, or both for storing and/or retrieving data.

Reader system 300 operates by block 390 generating communications for RFID tags. These communications are ultimately transmitted by antenna block 351, with modulator/encoder block 354 encoding and modulating the information on an RF wave. Then data is received from the tags via antenna block 351, demodulated and decoded by demodulator/decoder block 353, and processed by processing block 390.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination. An example of such a subdivision is now described.

Figure 4:
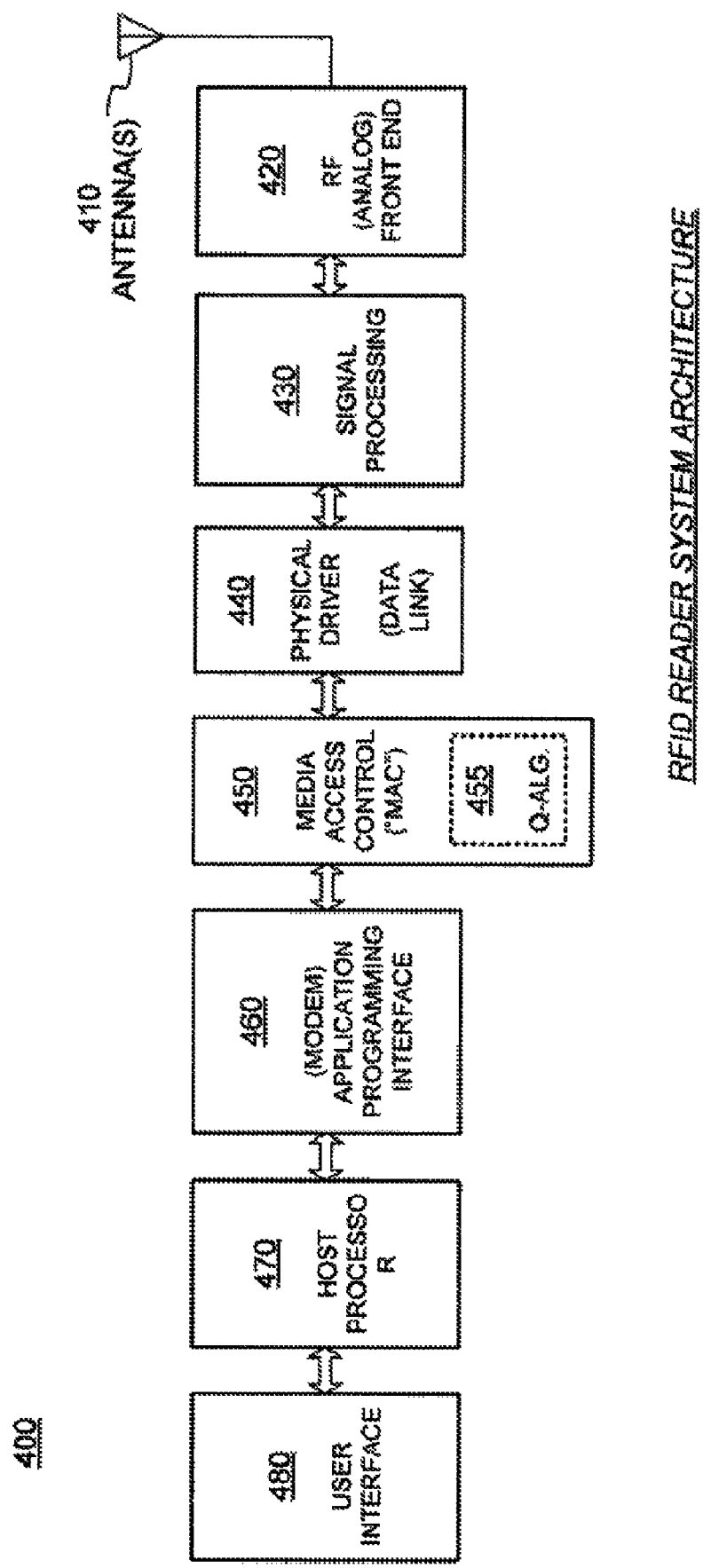
FIG. 4 is a block diagram illustrating an overall architecture of a RFID reader system according to embodiments.

FIG. 4 is a block diagram illustrating an overall architecture of a RFID reader system 400 according to embodiments. It will be appreciated that system 400 is considered subdivided into modules or components. Each of these modules may be implemented by itself, or in combination with others. It will be recognized that some aspects are parallel with those of FIG. 3. In addition, some of them may be present more than once.

RFID reader system 400 includes one or more antennas 410, and an RF Front End 420, for interfacing with antenna(s) 410. These can be made as described above. In addition, Front End 420 typically includes analog components.

System 400 also includes a Signal Processing module 430. In this embodiment, module 430 exchanges waveforms with Front End 420, such as I and Q waveform pairs. In some embodiments, signal processing module 430 is implemented by itself in an FPGA.

System 400 also includes a Physical Driver module 440, which is also known as Data Link. In this embodiment, module 440 exchanges bits with module 430. Data Link 440 can be the stage associated with framing of data. In one embodiment, module 440 is implemented by a Digital Signal Processor.

System 400 additionally includes a Media Access Control module 450, which is also known as MAC layer. In this embodiment, module 450 exchanges packets of bits with module 440. MAC layer 450 can be the stage for making decisions for sharing the medium of wireless communication, which in this case is the air interface. Sharing can be between reader system 400 and tags, or between system 400 with another reader, or between tags, or a combination. In one embodiment, module 450 is implemented by a Digital Signal Processor.

In a number of embodiments it is preferred to host the Q-algorithm in MAC layer 450. Indeed, in the shown embodiment there is a module 455 that implements the Q-algorithm. It should be remembered, however, that this is only a design choice, and that the Q-algorithm may be hosted by other modules or a combination of modules.

System 400 moreover includes an Application Programming Interface module 450, which is also known as API, Modem API, and MAPI. In some embodiments, module 460 is itself an interface for a user.

System 400 further includes a host processor 470. Processor 470 exchanges signals with MAC layer 450 via module 460. In some embodiments, host processor 470 is not considered as a separate module, but one that includes some of the above-mentioned modules of system 400. A user interface 480 is coupled to processor 470, and it can be manual, automatic, or both.

Host processor 470 can include applications for system 400. In some embodiments, elements of module 460 may be distributed between processor 470 and MAC layer 450.

It will be observed that the modules of system 400 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 410 as signals, which are in turn processed successively by the various modules in the chain. Processing can terminate in any one of the modules. In a transmitting mode, initiation can be in any one of these modules. That, which is to be transmitted becomes ultimately signals for antenna(s) 410 to transmit as wireless waves.

The architecture of system 400 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software. This is regardless of how each element is implemented.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

FIG. 5 is a flowchart 500 for describing a process for an RFID reader system to measure received signals, for reporting the occupancy of slots. The whole flowchart 500 can be performed by various components of an RFID reader system, such as was described with reference to FIG. 4. In other embodiments, components alone are considered.

Flowchart 500 can be performed during inventorying. According to an operation 510, a decision is made whether a new value should be used for the Q parameter, or the same one should be retained. The first time operation 510 is performed, the first value for the Q parameter will be a new one anyway, and execution proceeds to an operation 520.

According to operation 520, a new value is decided for the Q parameter. Another time that operation 520 is executed, this new value will be a next value. The new value is decided as described in the copending and incorporated U.S. patent application Ser. Nos. 11/210,573, 11/210,575, and 11/210,422.

According to an operation 530, a first reader command is caused to be transmitted to the RFID tags, for inventorying them. The first reader command may be encoded in a modulated carrier wave, which is transmitted as caused by the appropriate component.

The first reader command communicates the value for the Q parameter decided in operation 520. In some embodiments the first reader command is one of a Query command, and in others a QueryAdj command.

As such, the first reader command causes each of the RFID tags to occupy one of a number of first slots that are defined by the first value. An example is now described in more detail.

Figure 6A:
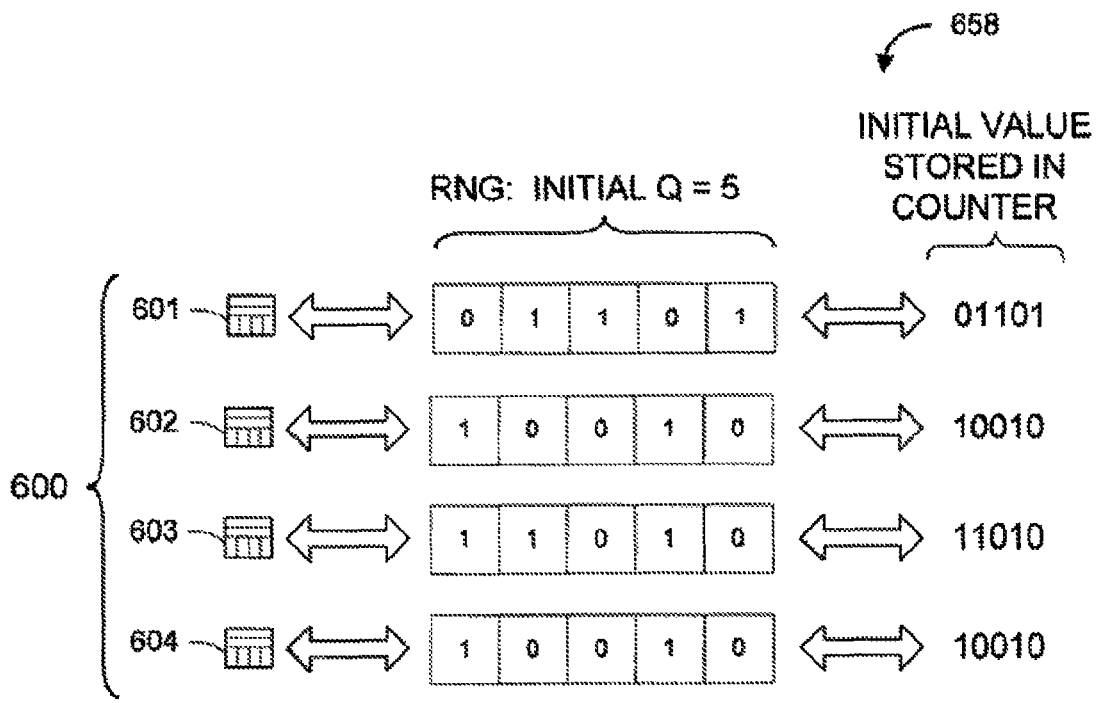
FIG. 6A is a diagram illustrating an example of tags filling their slot counters by Random Number Generators, in response to commands by an RFID reader, each thus occupying a slot.

FIG. 6A illustrates a diagram 658, showing an example of tags filling their slot counters by Random Number Generators, in response to commands by an RFID reader. In this diagram a population 600 includes four tags 601, 602, 603, 604.

As mentioned previously, the reader does not know the size of the population, and guesses in an inventorying round as to how many tags there are. In this case, it guesses Q=5. Each of tags 601, 602, 603, 604 chooses a Q-bit random number, and stores it in their slot counter as shown.

Figure 6B:
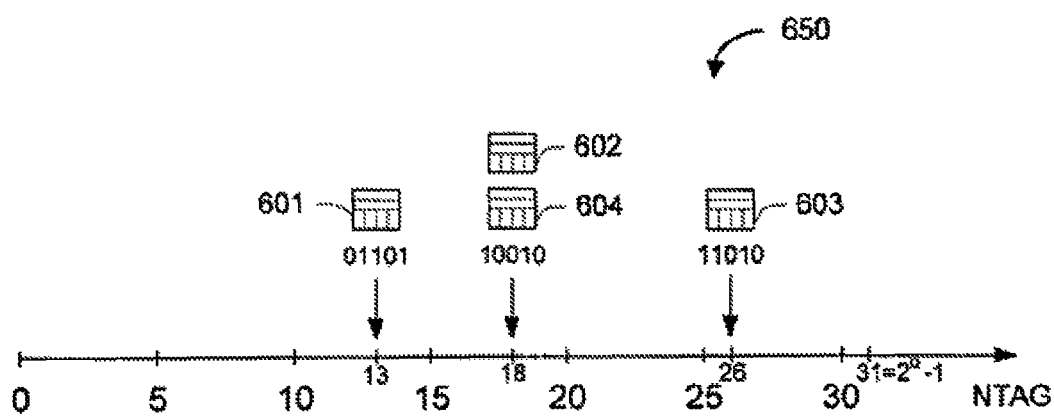
FIG. 6B is a diagram illustrating how the numbers stored in the slot counters of FIG. 6A result in randomly chosen slots that arrange the RFID tags in an order to be accessed by an RFID reader.

FIG. 6B illustrates diagram 650, showing a linear axis of slots, and how the numbers stored in the slot counters of FIG. 6A result in randomly chosen slots for the RFID tags, in an order to be accessed by an RFID reader.

As shown in diagram 650, two of the tags (602, 604) have generated the same binary random number (10010), which equals 18, so they occupy the 18th slot. In addition, tag 601 occupies slot 13, which tag 603 occupies slot 26.

Returning now to FIG. 5, the slots will now be examined individually. In some embodiments, the above command permits examining the contents of slot 0.

According to an operation 540, a QueryRep command is transmitted to the tags. In fact, one such QueryRep command is transmitted for examining each slot in an inventory round. Two examples of inventory rounds are now described.

FIG. 7A is an action table 700 illustrating actions for an RFID reader system to singulate a population of RFID tags with complete inventory rounds.

Action table 700 has rows with commands by the reader, the prevailing Q value, and what the tags do. Only the Query command communicates a Q, while a series of QueryRep commands examines all the slots that have been defined, for a complete inventorying round. Here two such complete inventorying rounds are shown, one with Q1 and one with Q2.

FIG. 7B is another action table 750 illustrating actions for an RFID reader system to singulate a population of RFID tags with incomplete inventory rounds.

Action table 750 has rows with commands by the reader, the prevailing Q value, and what the tags do. The Q value is changed a number of times by the QueryAdj command, before a round is completed.

Figure 8A:
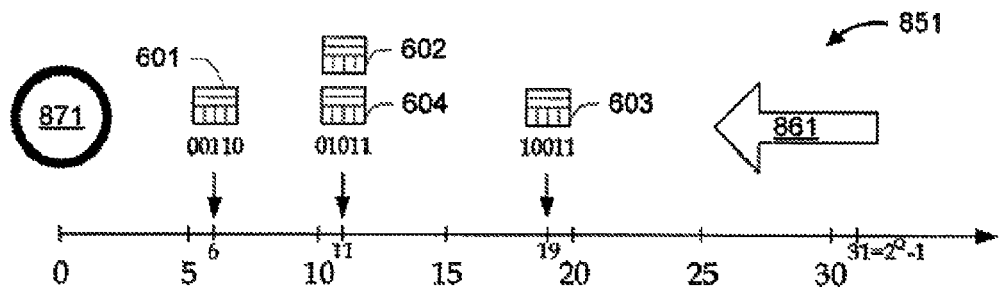
FIG. 8A, FIG. 8B, and FIG. 8C are diagrams illustrating the result of sequentially decrementing the numbers stored in the slot counters of the RFID tags of FIG. 6B, as called for by the action table of FIG. 7A, and replying when it becomes zero.
Figure 8B:
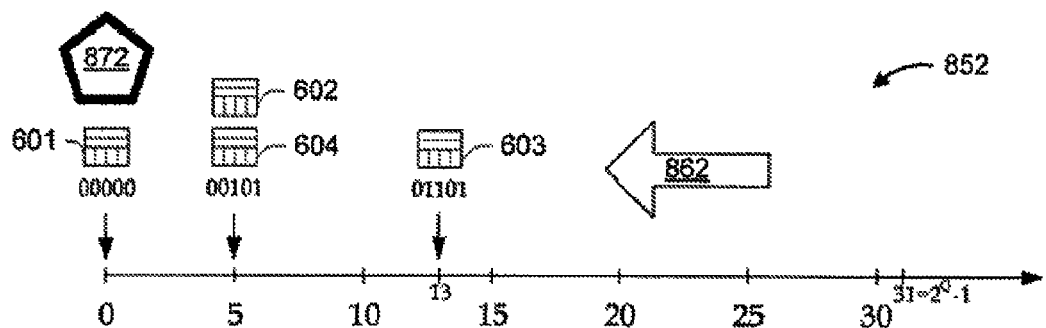
Figure 8C:
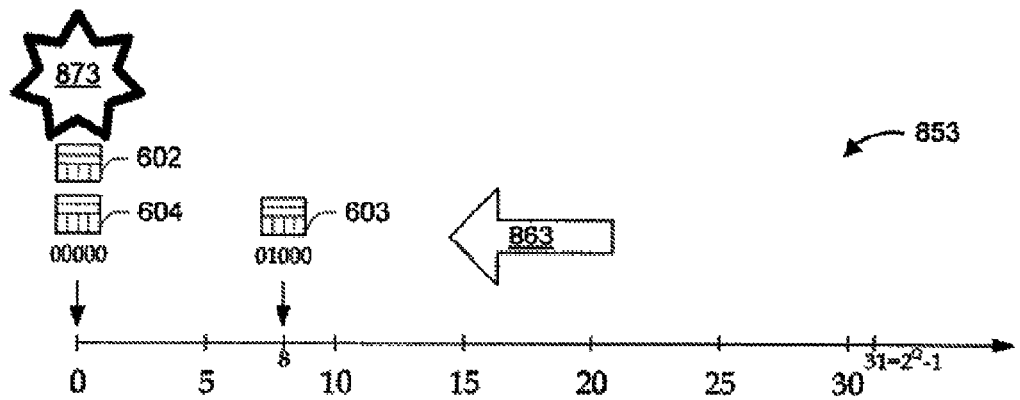

FIG. 8A, FIG. 8B, and FIG. 8C are diagrams illustrating the result of decrementing the numbers stored in the slot counters of the RFID tags of FIG. 6B, as called for by action table 700, and replying when it becomes zero.

Each QueryRep command is for examining one more of the slot. With each QueryRep command, the tags decrement the numbers in their slot counters by one. The tags reaching the number zero in their slot counter respond to the reader. As a result of the decrementing and responding process, each time three outcomes are possible:

"empty contents" (no reply received—no tag identified with it),

"single reply contents" (exactly one reply received, from one tag), or

"collision contents" (more than one reply received, more than one tag).

Diagram 851 shows an example of the first case. As a result of continuing decrementing (arrow 861), none of the tags 601-604 reach zero. Accordingly, content 871 is an empty content, and the reader knows that no tag occupied the slot, at least in theory.

Diagram 852 shows an example of the second case. As a result of continuing decrementing (arrow 862), one of the tags (601) reaches zero value in its slot counter, and thus sends a reply to the reader. Accordingly, content 872 is a single reply content, and the reader knows that a single tag occupied the slot, at least in theory.

Diagram 853 shows an example of the third case. As a result of continuing decrementing (arrow 863), two of the tags (602, 604) reach zero value in their slot counters, and send replies, which collide. Accordingly, content 873 is a content with a collision. The collided responses can be from more than two tags. Accordingly the reader knows that two or more tags occupied the slot, at least in theory.

Attention is now drawn to detection within a single slot. The QueryRep command causes a tag occupying the slot to backscatter a response within a tag response time window. In addition, the tag must be silent at a tag silent period of the first slot that is outside the tag response time window. The tag response time window and the tag silent periods can be known from the Air Interface communication protocol in use, and which is known in advance to the reader system. An example is now described.

Figure 9:
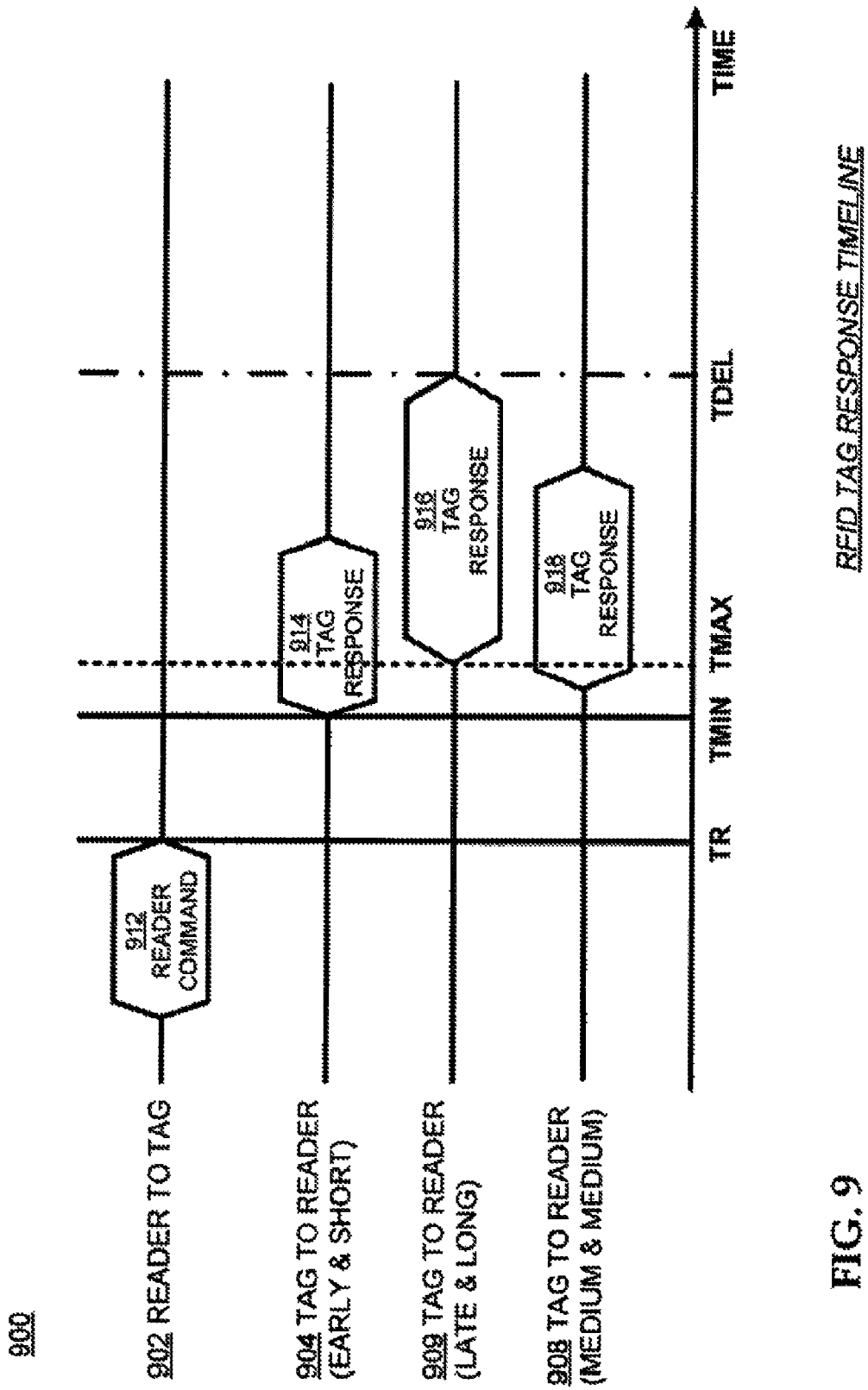
FIG. 9 shows a timeline with examples of RFID tag responses during inventorying.

FIG. 9 shows a diagram 900, that has a timeline with examples of RFID tag responses during inventorying. In diagram 900, communication between the reader and a tag begins with reader to tag transmission (902) which is initiated by the transmission of a signal that encodes reader command 912. As per the above, here reader command 912 can be a QueryRep. The transmission of the reader command 912 ends at time point TR.

In the Gen2 Spec it is specified that, after time TR, there shall be a minimum tag silent period TMIN, during which no tag may respond. For inventorying commands, responses may start either at TMIN, or at a little later time point TMAX.

Three possible tag responses are shown, namely 914, 916, and 918. They each start between TMIN and TMAX, and have different durations. For the purposes of this example, tag response 916 starts at the latest possible time (TMAX), and is of the longest possible duration. As such, it ends at a delay time TDEL.

The delay time TDEL depends on which commands are used. For example, if another reader command is transmitted between the QueryRep commands, it could ask for more or different information of the type that takes longer. As such, the delay time TDEL can be increased.

One or more of these tag responses 914, 916, 918 can be perceived and detected by the reader as a signal. The challenge is for the reader to discern which signals are from the tags, and which from the environment.

It will be appreciated that the tag response time window is between TMIN and TDEL. In addition, two tag silent times are defined. The first is between TR and TMIN, before the tag response time window. The second is after TDEL, perhaps limited by other design factors, such as desire to inventory quickly, and so on.

Figure 10:
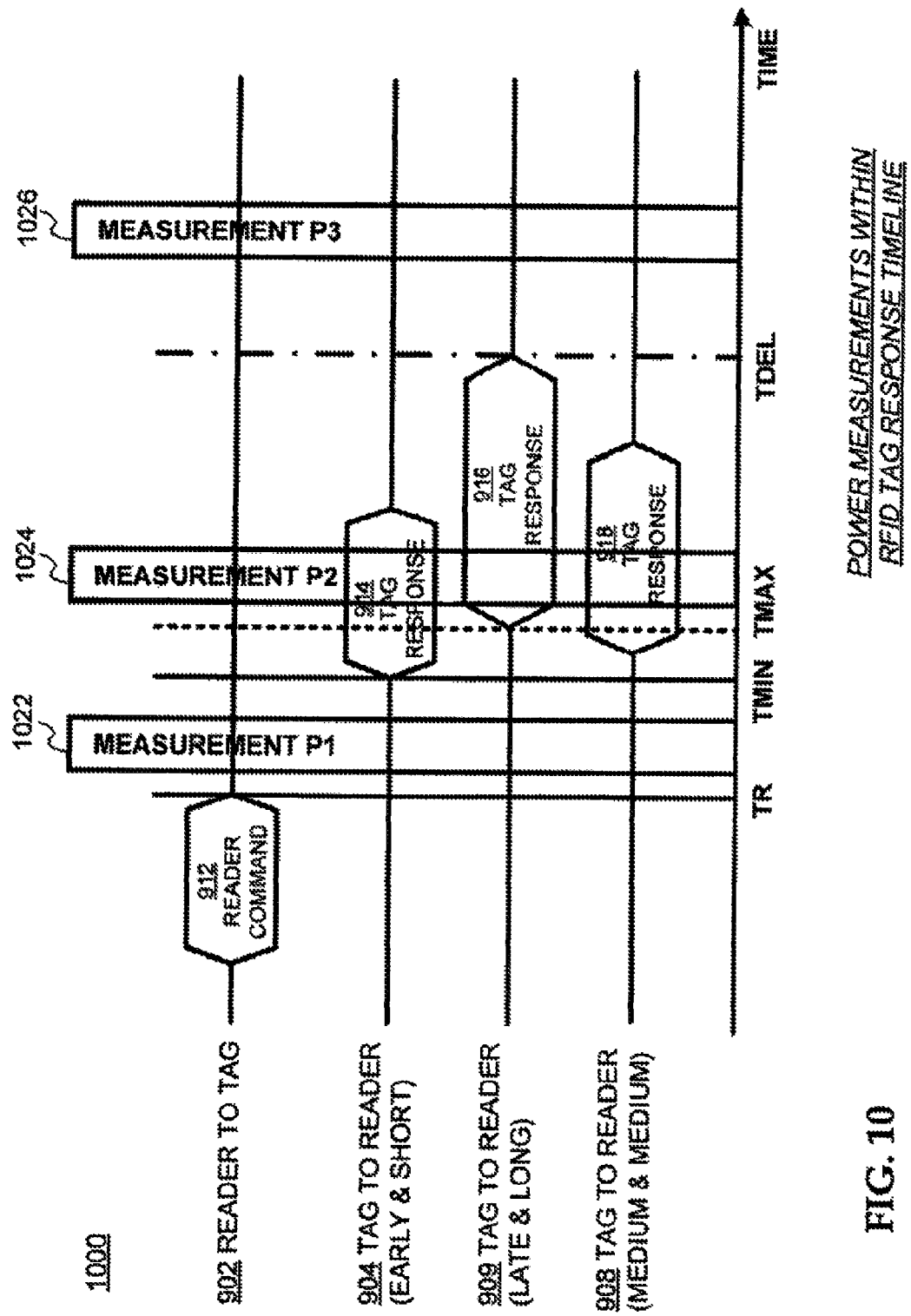
FIG. 10 shows the timeline of FIG. 9, with superimposed examples of possible timings for power measurements according to embodiments.

FIG. 10 shows a diagram 1000, where the timeline of FIG. 9 is shown with superimposed examples of possible timings for power measurements according to embodiments.

In diagram 1000, three possible measurements are illustrated. The first measurement P1 (1022) is made during the silent period between time points TR and TMIN following the transmission of reader command 912. As per the above, measurement P1 is done with the confidence that no tag responses are included.

The second power measurement P2 (1024) may be performed at any time during the tags' responses. The preferred time is between TMAX and the possible end of tag response 914, so as to allow for all possibilities.

Finally, a third power measurement P3 (1026) may be made in the silent period after TE when all tag responses are expected to be completed. Again, measurement P3 is done with the confidence that no tag responses are included.

Returning now to FIG. 5, according to an operation 542, an initial reference signal is received during one of the tag silent periods. According to some embodiments, the reference signal maybe a background noise detected by the reader while the tags are silent.

According to an operation 544, an aspect of the initial reference signal is measured. This can be measurement P1 or P3 shown in FIG. 10. Any aspect can be measured, such as a power, a voltage a current, and so on. The aspect is measured from a single measurement or many, or a continuing one integrating over some time.

While operations 542 and 544 can be performed only once, it is advantageous that they be performed more frequently. For example, they can be performed ever time a command is transmitted, as per operation 540.

An advantage, therefore, is that the measured reference signal reflects the ambient noise, free from any backscatter of the RFID tags of interest. In some embodiments, the ambient noise can be too high, and other measures can be implemented. For example, if the measured aspect exceeds a threshold, a data rate of a transmit circuit of the RFID system can be adjusted down. Or the RFID tags can be commanded to not respond on the baseband frequency of the first signal, but on its subcarrier. Inverse measures can be implemented if the ambient noise is lower than expected.

According to a next operation 546, a detection threshold is set or updated from the measured aspect. The detection threshold can be set in any number of ways, such as by adjusting a filter in a receive circuit of the RFID reader system. As such, the detection threshold can be determined as a quantity expressed in one of: dB, Watts, Volts, Amps, a number, and so on.

An advantage, therefore, is that the detection threshold is set at a time that it is known that the tags are not backscattering, because they have been forced to be silent from the reader. This will enable more reliable measurements later on.

Operations 542, 544, 546 may happen only once, and thus the other times execution can proceed from operation 540 to operation 548. Or they can be repeated for more robustness. For example, an updated reference signal can be received during another one of the tag silent periods, an aspect of it can be measured, and the detection threshold can be updated. This is advantageous in the event that the ambient noise is changing.

According to an operation 548, a second signal is detected by the reader within the known tag response time window, when the tag response is expected. The second signal can be received before or after the initial reference signal. And such signals can be received at these windows for multiple examined slots.

A power of the second signal is measured, e.g. by one or many measurements, such as the above. Instead of the power, another aspect of the second signal can be equivalently measured. And the measured aspect can be expressed or converted to the same units as the detection threshold, for the impending comparison with the detection threshold to make sense. Of all possible aspects, power is mentioned more predominantly in this document, because it is the preferred signal aspect to measure.

According to an operation 550, it is determined from the second signals whether the occupancy of the examined first slots is none or at least one of the RFID tags. This can be performed in any number of ways. Plus, it can be performed the same way or different ways for each slot.

For at least one of the slots, operation 550 is performed by comparing the detection threshold to a power of a second signal corresponding to the certain slot. In that case, the occupancy of that slot is determined to be none if the second signal power is less than the detection threshold, and at least one if the second signal power is greater than the detection threshold.

According to an optional operation 560, the determined occupancy of the slot is reported to the host of the Q-algorithm. Then execution reverts to operation 510. This time, however, the decision of operation 510 is performed according to the determined occupancy of the slots.

In some instances, there will be no new value for the Q parameter, and execution will proceed to operation 540 for examining one more slot.

In other instances, execution will proceed to operation 520, and a new value for the Q parameter will be decided upon, in view of the determined occupancy of the slots. Then execution proceeds again to operation 530, and a new reader command is transmitted to the RFID tags, which communicates the new value for the Q parameter. The new value can be communicated explicitly, or indirectly as an increment or a decrement.

Methods of the invention can also be for only a component of the reader system, which is considered separately, and intended to work with other such components. Such separate components were first discussed with reference to FIG. 4.

For such a component, an operation can be that a first inventory instruction is received, which includes a first value for a Q parameter. Then the component can cause to be transmitted to the RFID tags a first reader command that communicates the first value for the Q parameter. As per the above, this causes the tags to occupy slots such as those of FIG. 6B.

Then the component an cause to be transmitted to the RFID tags sequentially a number of QueryRep commands, for examining respective slots for their occupancy, as per the above.

Again a reference signal can be received during a tag silent period, and an aspect of it measured. Then a detection threshold can be set or updated from the measured aspect. Then a second signal can be detected, and the slot occupancy can be determined, all again as per the above. Then a report can be transmitted, informing of the determined occupancy. Then a second inventory instruction can be received that includes a new value for the Q parameter, which has been determined responsive to the report.

Then the component can cause to be transmitted to the RFID tags another reader command, which communicates the next value for the Q parameter. As per the above, this causes the tags to occupy a new number of slots, and so on.

In the above, what was determined was only whether the occupancy is zero or higher than zero. This can be enough information for running advantageously the Q-algorithm.

In some embodiments, additional measures are taken to determine the occupancy with further certainty. For example, the second signal can be demodulated, and tested according to a demodulation score. If the slot occupancy is higher than zero and demodulation produced a good score, then the occupancy was exactly 1, and so on.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and sub-combinations of elements, features, steps, and/or functions, which are regarded as novel and non-obvious. Additional claims for other combinations and sub-combinations may be presented in this or a related document.

What is claimed is:

1. A Radio Frequency Identification (RFID) reader system for communicating with a plurality of RFID tags, the system operable to:

cause to be transmitted to the RFID tags a first reader command that communicates a first value for a Q parameter, the first reader command thus causing each of the RFID tags to occupy one of a plurality of first slots that are defined by the first value;

then cause a plurality of QueryRep commands to be transmitted sequentially to the RFID tags, each QueryRep command for examining a respective one of the first slots for its occupancy by causing any of the RFID tags occupying the respective first slot to backscatter a response within a tag response time window of the first slot and be silent at a tag silent period of the first slot that is outside the tag response time window of the first slot;

receive an initial reference signal during one of the tag silent periods of one of the first slots;

measure an aspect of the initial reference signal;

set a detection threshold from the measured aspect;

detect second signals during at least some of the tag response time windows of the examined first slots;

determine from the second signals whether the occupancy of the examined first slots is none of at least one of the RFID tags, in which the determination for at least a certain one of the first slots is performed by comparing the detection threshold to a power of a second signal corresponding to the certain slot;

decide according to the determined first slot occupancies and according to a Q-algorithm a second value for the Q parameter; and then cause to be transmitted to the RFID tags a second reader command that communicates the second value for the Q parameter, the reader second command thus causing each of the RFID tags to occupy one of a plurality of second slots that are defined by the second value.

2. The system of claim 1, in which
one of the first reader command and the second reader command is one of a Query command and a QueryAdj command.

3. The system of claim 1, in which the tag silent period occurs before its corresponding tag response time window.

4. The system of claim 1, in which
the tag silent period occurs a delay time after its corresponding tag response time window.

5. The system of claim 4, in which
the delay time is increased if another reader command is caused to be transmitted between two of the QueryRep commands.

6. The system of claim 1, in which the aspect is one of power, voltage and current.

7. The system of claim 1, in which the aspect is measured from a plurality of measurements.

8. The system of claim 1, in which the detection threshold is determined as a quantity expressed in one of: dB, Watts, Volts, Amps, and a number.

9. The system of claim 1, in which
the detection threshold is set by adjusting a filter in a receive circuit of the RFID reader system.

10. The system of claim 1, further operable to: receive an updated reference signal during one of the tag silent periods of one of the first slots;
measure an aspect of the updated reference signal; and
update the detection threshold from the measured aspect of the updated reference signal.

11. The system of claim 1, in which the occupancy determination is performed similarly for all the slots.

12. The system of claim 1, in which the occupancy of the certain slot is determined to be none if the second signal power is less than the detection threshold.

13. The system of claim 1, in which the occupancy of the certain slot is determined to be at least one if the second signal power is greater than the detection threshold.

14. A method for a Radio Frequency Identification (RFID) reader system to inventory a population of RFID tags, comprising:
causing to be transmitted to the RFID tags a first reader command that communicates a first value for a Q parameter, the first reader command thus causing each of the RFID tags to occupy one of a plurality of first slots that are defined by the first value;
then causing a plurality of QueryRep commands to be transmitted sequentially to the RFID tags, each QueryRep command for examining a respective one of the first slots for its occupancy by causing any of the RFID tags occupying the respective first slot to backscatter a response within a tag response time window of the first slot and be silent at a tag silent period of the first slot that is outside the tag response time window of the first slot;
receiving an initial reference signal during one of the tag silent periods of one of the first slots;
measuring an aspect of the initial reference signal;
setting a detection threshold from the measured aspect;
detecting second signals during at least some of the tag response time windows of the examined first slots;
determining from the second signals whether the occupancy of the examined first slots is none or at least one of the RFID tags, in which the determination for at least a certain one of the first slots is performed by comparing the detection threshold to a power of a second signal corresponding to the certain slot;
deciding according to the determined first slot occupancies and according to a Q algorithm a second value for the Q parameter; and
then causing to be transmitted to the RFID tags a second reader command that communicates the second value for the Q parameter, the reader second command thus causing each of the RFID tags to occupy one of a plurality of second slots that are defined by the second value.

15. The method of claim 14, in which one of the first reader command and the second reader command is one of a Query command and a Query Adj command.

16. The method of claim 14, in which the tag silent period occurs before its corresponding tag response time window.

17. The method of claim 14, in which the tag silent period occurs a delay time after its corresponding tag response time window.

18. The method of claim 17, in which the delay time is increased if another reader command is caused to be transmitted between two of the QueryRep commands.

19. The method of claim 14, in which the aspect is one of power, voltage and current.

20. The method of claim 14, in which the aspect is measured from a plurality of measurements.

21. The method of claim 14, in which the detection threshold is determined as a quantity expressed in one of: dB, Watts, Volts, Amps, and a number.

22. The method of claim 14, in which the detection threshold is set by adjusting a filter in a receive circuit of the RFID reader system.

23. The method of claim 14, further comprising: receiving an updated reference signal during one of the tag silent periods of one of the first slots;
measuring an aspect of the updated reference signal; and
updating the detection threshold from the measured aspect of the updated reference signal.

24. The method of claim 14, in which the occupancy determination is performed similarly for all the slots.

25. The method of claim 14, in which the occupancy of the certain slot is determined to be none if the second signal power is less than the detection threshold.

26. The method of claim 14, in which the occupancy of the certain slot is determined to be at least one if the second signal power is greater than the detection threshold.

27. A component for a Radio Frequency Identification (RFID) reader system operable to communicate with a plurality of RFID tags, the component operable to:
receive a first inventory instruction that includes a first value for a Q parameter;
cause to be transmitted to the RFID tags a first reader command that communicates the first value for the Q parameter, the first reader command thus causing each of the RFID tags to occupy one of a plurality of first slots that are defined by the first value;
then cause a plurality of QueryRep commands to be transmitted sequentially to the RFID tags, each QueryRep command for examining a respective one of the first slots for its occupancy by causing any of the RFID tags occupying the respective first slot to backscatter a response within a tag response time window of the first slot and be silent at a tag silent period of the first slot that is outside the tag response time window of the first slot;
receive an initial reference signal during one of the tag silent periods of one of the first slots;
measure an aspect of the initial reference signal;
set a detection threshold from the measured aspect;
detect second signals during at least some of the tag response time windows of the examined first slots;
determine from the second signals whether the occupancy of the examined first slots is none or at least one of the RFID tags, in which the determination for at least a certain one of the first slots is performed by comparing the detection threshold to a power of a second signal corresponding to the certain slot;
transmit a report informing of the determined occupancy;
receive a second inventory instruction that includes a second value for the Q parameter that has been determined responsive to the report; and
then cause to be transmitted to the RFID tags a second reader command that communicates the second value for the Q parameter, the reader second command thus causing each of the RFID tags to occupy one of a plurality of second slots that are defined by the second value.

28. The component of claim 27, in which
one of the first reader command and the second reader command is one of a Query command and a QueryAdj command.

29. The component of claim 27, in which the tag silent period occurs before its corresponding tag response time window.

30. The component of claim 27, in which
the tag silent period occurs a delay time after its corresponding tag response time window.

31. The component of claim 30, in which
the delay time is increased if another reader command is caused to be transmitted between two of the QueryRep commands.

32. The component of claim 27, in which the aspect is one of power, voltage and current.

33. The component of claim 27, in which the aspect is measured from a plurality of measurements.

34. The component of claim 27, in which the detection threshold is determined as a quantity expressed in one of: dB, Watts, Volts, Amps, and a number.

35. The component of claim 27, in which the detection threshold is set by adjusting a filter in a receive circuit of the RFID reader system.

36. The component of claim 27, further operable to: receive an updated reference signal during one of the tag silent periods of one of the first slots;
measure an aspect of the updated reference signal; and
update the detection threshold from the measured aspect of the updated reference signal.

37. The component of claim 27, in which the occupancy determination is performed similarly for all the slots.

38. The component of claim 27, in which the occupancy of the certain slot is determined to be none if the second signal power is less than the detection threshold.

39. The component of claim 27, in which the occupancy of the certain slot is determined to be at least one if the second signal power is greater than the detection threshold.

40. A method for a component of a Radio Frequency Identification (RFID) reader system, comprising:
receiving a first inventory instruction that includes a first value for a Q parameter;
causing to be transmitted to the RFID tags a first reader command that communicates the first value for the Q parameter, the first reader command thus causing each of the RFID tags to occupy one of a plurality of first slots that are defined by the first value;
then causing a plurality of QueryRep commands to be transmitted sequentially to the RFID tags, each QueryRep command for examining a respective one of the first slots for its occupancy by causing any of the RFID tags occupying the respective first slot to backscatter a response within a tag response time window of the first slot and be silent at a tag silent period of the first slot that is outside the tag response time window of the first slot;
receiving an initial reference signal during one of the tag silent periods of one of the first slots;
measuring an aspect of the initial reference signal;
setting a detection threshold from the measured aspect;
detecting second signals during at least some of the tag response time windows of the examined first slots;
determining from the second signals whether the occupancy of the examined first slots is none or at least one of the RFID tags, in which the determination for at least a certain one of the first slots is performed by comparing the detection threshold to a power of a second signal corresponding to the certain slot;
transmitting a report informing of the determined occupancy;
receiving a second inventory instruction that includes a second value for the Q parameter that has been determined responsive to the report; and
then causing to be transmitted to the RFID tags a second reader command that communicates the second value for the Q parameter, the reader second command thus causing each of the RFID tags to occupy one of a plurality of second slots that are defined by the second value.

41. The method of claim 40, in which one of the first reader command and the second reader command is one of a Query command and a QueryAdj command.

42. The method of claim 40, in which the tag silent period occurs before its corresponding tag response time window.

43. The method of claim 40, in which the tag silent period occurs a delay time after its corresponding tag response time window.

44. The method of claim 43, in which the delay time is increased if another reader command is caused to be transmitted between two of the QueryRep commands.

45. The method of claim 40, in which the aspect is one of power, voltage and current.

46. The method of claim 40, in which the aspect is measured from a plurality of measurements.

47. The method of claim 40, in which the detection threshold is determined as a quantity expressed in one of: dB, Watts, Volts, Amps, and a number.

48. The method of claim 40, in which the detection threshold is set by adjusting a filter in a receive circuit of the RFID reader system.

49. The method of claim 40, further comprising: receiving an updated reference signal during one of the tag silent periods of one of the first slots;
measuring an aspect of the updated reference signal; and
updating the detection threshold from the measured aspect of the updated reference signal.

50. The method of claim 40, in which the occupancy determination is performed similarly for all the slots.

51. The method of claim 40, in which the occupancy of the certain slot is determined to be none if the second signal power is less than the detection threshold.

52. The method of claim 40, in which the occupancy of the certain slot is determined to be at least one if the second signal power is greater than the detection threshold.

* * * * *

UNITED STATES PATENT AND TRADEMARK OFFICE
CERTIFICATE OF CORRECTION

| | | |
|---|---|---|
| PATENT NO. | : 8,077,013 B2 | Page 1 of 1 |
| APPLICATION NO. | : 11/622686 | |
| DATED | : December 13, 2011 | |
| INVENTOR(S) | : Cooper | |

It is certified that error appears in the above-identified patent and that said Letters Patent is hereby corrected as shown below:

1) Title Page, item (56); please delete "1.1.0." in column 2 (other publications), line 16, and insert -- 1.0.8. --, therefor, 2) Please delete "11/622,066" in column 1, line 14, and insert -- 11/622,066, --, therefor, 3) Please delete "Stingulation" in column 1, line 60, and insert -- Singulation --, therefor, 4) Please delete "rounds." in column 3, line 3, and insert -- rounds; --, therefor, 5) Please delete "rounds." in column 3, line 6, and insert -- rounds; --, therefor, 6) Please delete "450," in column 8, line 58, and insert -- 460, --, therefor, 7) Please delete "examines" in column 10, line 40, and insert -- examine --, therefor, 8) Please delete "an" in column 13, line 40, and insert -- can --, therefor, 9) In Claim 14, please delete "Q algorithm" in column 15, line 55, and insert -- Q-algorithm --, therefor, and 10) In Claim 15, please delete "Query Adj" in column 15, line 65, and insert -- QueryAdj --, therefor.

Signed and Sealed this
Third Day of April, 2012

David J. Kappos
*Director of the United States Patent and Trademark Office*